Dec. 10, 1957  H. H. CHAMBERLAIN  2,816,265
PHASE SEQUENCE INDICATOR
Filed March 31, 1955

Inventor:
Harvey H. Chamberlain
by, Richard E. Horsley
His Attorney

United States Patent Office 2,816,265
Patented Dec. 10, 1957

2,816,265

PHASE SEQUENCE INDICATOR

Harvey H. Chamberlain, Marblehead, Mass., assignor to General Electric Company, a corporation of New York Application March 31, 1955, Serial No. 498,246

12 Claims. (Cl. 324—86)

My invention relates to phase sequence indicators and has for its principal object the provision of an improved arrangement particularly suitable for determining phase rotation or sequence of three phase alternating voltages.

It is another object of my invention to provide an improved phase sequence indicator which requires no moving parts.

It is a further object of my invention to provide an improved phase sequence indicator which is comprised of a minimum number of components and which can be manufactured at a low cost.

Briefly stated, my invention provides, in one form thereof, a circuit arrangement connectible to a three phase alternating voltage, the phase sequence of which is to be determined, and comprised of resistors and capacitors along with a pair of neon bulbs, or other potential sensing or indicating devices, one of which is energized when the phase rotation of the impressed voltage is in one sequence and the other of which is energized when the impressed voltage phase rotation is in the opposite sequence. The circuit arrangement and the method of determining the magnitudes of the various resistors and capacitors is set forth in the detailed description which follows.

Other objects and advantages of my invention will also be apparent from the following description taken in connection with the accompanying drawing, and its scope will be pointed out in the appended claims.

Figure 1:
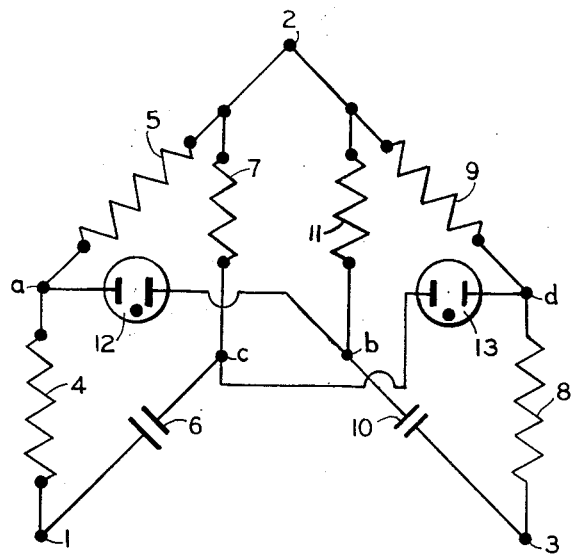
Figure 2:
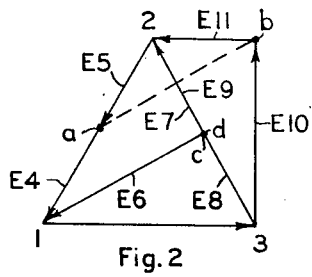
Figure 3:
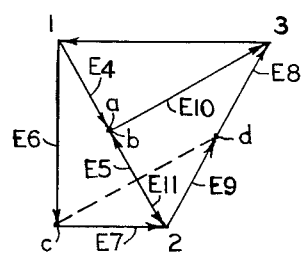
Figure 4:
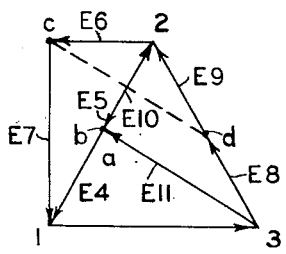
Figure 5:
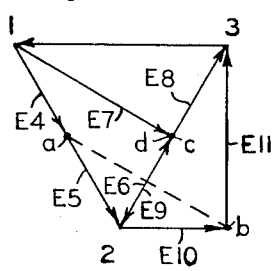

In the drawing, Fig. 1 is a schematic circuit diagram of a phase sequence indicator for three phase voltages embodying my invention; Figs. 2 and 3 are vector diagrams illustrating the relationship of the various voltages for positive and negative phase sequence respectively; while Figs. 4 and 5 are vector diagrams illustrating the relationship of the various circuit voltages for positive and negative phase sequence for a circuit slightly modified from that shown in Fig. 1 as will be hereinafter discussed.

Referring now to Fig. 1, I provide in accordance with the embodiment of my invention shown a circuit arrangement having terminals 1, 2 and 3 connectible to a three phase voltage source, the phase sequence of which is to be determined.

Connected between the terminals 1 and 2 are resistors 4 and 5 which form an intermediate potential point or voltage tap $a$ as shown. A capacitor 6 and a resistor 7 are connected in series with each other and in parallel with the resistors 4 and 5, the capacitor 6 and the resistor 7 thereby forming an intermediate potential point $c$ between terminals 1 and 2.

A similar arrangement is connected between the terminals 2 and 3 with resistors 8 and 9 being connected to form an intermediate potential point $d$, and a capacitor 10 and a resistor 11 being connected to form an intermediate potential point $b$.

A potential sensitive device, such as neon lamp 12 is connected between the intermediate voltage points $a$ and $b$ and a second potential sensitive device, such as a neon lamp 13, is connected between the intermediate voltage points $c$ and $d$.

As will be hereinafter explained, the neon lamp 12 is caused to light when the terminals 1, 2 and 3 are connected to an alternating voltage source having a positive sequence, that is in the sequence 1—2—3; and the neon lamp 13 is caused to light when the terminals are connected to a voltage source having a negative phase sequence, that is in the sequence 3—2—1.

Referring now to the vector diagram of Fig. 2, it will be seen that the respective line voltages are shown 120° apart as they appear across the terminals 1, 2 and 3. For purposes of this analysis, all vectors are assumed to rotate in the counterclockwise direction in accordance with established convention. It will be seen therefore that the phase sequence of the terminal voltages shown in Fig. 2 is in the sequence 1—2—3, which is defined as being a positive phase sequence.

The voltages appearing across the resistors 4 and 5 are shown as vectors E4 and E5 and it will be observed that these vectors are in phase with the terminal voltage vector 2—1 and that these in-phase voltage drops E4 and E5 place the intermediate voltage point $a$ along the vector 2—1 as shown. The voltage rises across condenser 6 and resistor 7 are shown as E6 and E7 respectively and it will be seen that the voltage vector E6, representing the voltage rise across condenser 6 lags terminal voltage 2—1 and that it is electrically positioned such that the intermediate point $c$ leads in phase the terminal voltage 2—1 and falls along the vector 2—3 as shown.

Referring now to the voltages appearing across the circuit elements connected between terminals 2 and 3, the voltages appearing across resistors 8 and 9 are represented by vectors E8 and E9 respectively, while the voltage rises appearing across condenser 10 and resistor 11 are represented by vectors E10 and E11 respectively. It will be seen that the voltages E8 and E9 are in phase with the terminal voltage 3—2 and that the voltage at point $d$ therefore lies along the vector 3—2. The relative magnitudes of resistors 8 and 9 and the condenser 6 and resistor 7 are chosen such that the potential of points $c$ and $d$ is substantially the same. Therefore the voltage appearing across the voltage sensitive lamp 13 is substantially zero or of such a negligible amount as to be incapable of causing the lamp 13 to glow.

On the other hand, voltage E10, which is the voltage rise appearing across condenser 10 lags in phase behind terminal voltage 3—2 and is 90° out of phase with resistive drop E11 as shown. It will be observed that the point $b$ therefore lags the vector by reason of the electrical placement of components as shown in Fig. 1. The point $b$ is then at some potential with respect to point $a$ which is represented by the dotted vector $a$—$b$. The magnitude of the voltage vector $a$—$b$ is sufficient to cause the lamp 12 to glow.

It will be observed therefore, in accordance with the foregoing vector diagram analysis, that when the circuit shown in Fig. 1 is connected to a three phase alternating voltage source where the direction of phase rotation is in the sequence 1—2—3, the lamp 13 is dark while the lamp 12 is caused to glow.

Fig. 3 is a vector diagram illustrating the relationship of the various terminal and circuit voltages when the circuit of Fig. 1 is connected to a three phase voltage having a negative phase sequence, that is, in the sequence 3—2—1. The voltages appearing across the various circuit components are identified by the same letter and numeral combinations as in Fig. 2.

Referring to Fig. 3, it will be observed that the points $a$ and $d$ lie along the terminal voltage vector 1—2 and 2—3 respectively since both of these points are determined by resistive voltage drops. The voltage vector E10, representing the voltage rise across condenser 10, lags the terminal voltage 2—3 and is of such a magnitude that the point b falls along the terminal voltage vector 1—2 and coincides with the point a. The point c on the other hand, which is determined by voltage rises E6 and E7 across condenser 6 and resistor 7 respectively is positioned such that it lags the terminal voltage 2—1 so that a voltage represented by the vector c—d appears across the lamp 13.

Thus, it will be seen that with a negative phase sequence, as shown in the diagram of Fig. 3, the lamp 12 will be dark and the lamp 13 will be caused to glow, which is just the opposite of the effect produced by a positive phase sequence.

As to the magnitudes of the various circuit components, it will be appreciated by those skilled in the art that, in order for the foregoing relationship to be obtained, the resistors 4 and 5 must be of approximately equal resistance in order to bring the point a to approximately the halfway point in potential between terminals 1 and 2. Similarly it will be appreciated that the resistors 8 and 9 should be approximately equal in resistance although, as is readily apparent, it is not necessary that the resistors 8 and 9 be of the same magnitude as resistors 4 and 5. In fact it is unnecessary that the sets of resistors 4 and 5, and 8 and 9 be of any particular relationship to each other so long as these two sets of resistors individually accomplish their function of electrically positioning points a and d as mentioned above.

Referring now to the selection of capacitors 6 and 10 and resistors 7 and 11, it will be apparent to those skilled in the art that the voltage rises across the two capacitors should, in each case, lag their respective terminal voltages by approximately 30°. Using this relationship, the resistance to reactance relationship may be easily determined and from such relationship, the value of capacitance may be determined for any chosen resistance value, and vice versa. Once again, it will be observed that the selection of capacitor 6 and resistor 7 is not in any way determined or affected by the magnitudes of capacitor 10 and the resistor 11 nor is the selection of the capacitor 10 and resistor 11 related in any way to the selection of capacitor 6 and resistor 7.

In other words, each of the two resistor, capacitor combinations may be selected individually, it being necessary only to provide the proper resistance to reactance relationship required in each case to secure a 30° lagging voltage across the capacitor as mentioned above and to select values such that the impedance of resistors 4 and 5 in parallel plus that of capacitor 10 and resistor 11 in parallel is not so low as to cause excessive lamp current nor so high as to cause the lamp to glow too dimly. Similar considerations apply to components 6, 7, 8 and 9.

It will be observed, however, that the foregoing considerations do not preclude the selection of components such that all resistors are equal and that both capacitors are of equal capacitance. It will be appreciated that the selection of components in this manner has obvious economic advantages. By way of example, in one device embodying this invention, the components where selected such that all resistors were of approximately 150,000 ohms and both capacitors were of a magnitude of about .010 microfarad in capacitance.

The relationship just mentioned is compromised very slightly from the theoretically correct values in order to permit usage of standard sizes but it will be seen that the variation is so small as to be insignificant, since the voltage appearing across the dark lamp is, in each case, much too small to cause the lamp to glow. It is expected that minor variations from the theoretical relationship may be made to take into account the economic advantages to be gained by selecting standard sizes, and it can be readily appreciated that such variations whether for economic or other reasons, are within the true scope and spirit of my invention.

It will be seen that the positions of the resistor 7 and the capacitor 6 may be reversed so long as capacitor 10 and resistor 11 are also interchanged with each other at the same time. The vector diagrams for positive and negative phase sequence for such an arrangement are shown at Figs. 4 and 5 respectively. It will be seen by referring to these diagrams that the relative voltage rises across the capacitors 6 and 10 are smaller and that they should theoretically lag their respective terminal voltages by about 60° instead of by 30° as is the theoretically correct relationship for the circuit arrangement shown in Fig. 1. With the modification just discussed, the capacitive reactance must be smaller relative to the resistance in the circuit and for that reason, the capacitors must be of greater magnitude relative to the size of the resistors employed. Also, it will be observed that the lamp indications are reversed; that is the lamp 13 glows for a positive phase sequence and the lamp 12 glows for a negative phase sequence.

It will be realized that other devices or arrangements may be used in place of the neon lamps 12 and 13 to detect or measure potential. The type of potential detecting device or arrangement employed and the sensitivity thereof will, to a certain extent, determine the amount by which the components may vary from a theoretically correct relationship while still retaining a satisfactory phase sequence indication.

Other variations, substitutions, combinations and changes within the scope of my invention will occur to those skilled in the art.

What I claim as new and desire to secure by Letters Patent of the United States is:

1. A phase sequence indicator comprising first, second and third terminals connectible to a three phase alternating voltage, means for establishing a pair of potential points intermediate said first and second terminals, one of said potential points being electrically connected so as to be substantially in phase with a voltage impressed across said first and second terminals, the other of said potential points being connected so as to lag in phase the voltage impressed across said first and second terminals when a three phase voltage of a given phase sequence is impressed on said terminals, and means for establishing a pair of potential points intermediate said second and third terminals, one of said last-mentioned potential points being electrically connected so as to be substantially in phase with a voltage impressed across said second and third terminals, and the other of said last-mentioned potential points being connected so as to lead in phase the terminal voltage across said second and third terminals when a three phase voltage of the same given phase sequence is impressed on said terminals.

2. A phase sequence indicator comprising first, second and third terminals electrically connectible to a three phase alternating voltage, a pair of circuits connected in parallel with each other between said first and second terminals, one of said circuits being capable of establishing a potential point intermediate said first and second terminals which is such as to be substantially in phase with an alternating voltage impressed across said first and second terminals, the other of said circuits being capable of establishing a potential point intermediate said first and second terminals which is such as to lag in phase the terminal voltage across said first and second terminals when a three phase voltage of a given phase sequence is impressed on said terminals, and a pair of circuits connected in parallel with each other between said second and third terminals, one of said last-mentioned circuits being capable of establishing a potential point intermediate said second and third terminals which is such as to be substantially in phase with an alternating voltage impressed across said second and third terminals, and the other of said last-mentioned circuits being capable of establishing a potential point intermediate said second and third terminals which is such as to lead in phase and terminal voltage across said second and third terminals when a three phase voltage of the same given phase sequence is impressed on said terminals.

3. A phase sequence indicator as set forth in claim 2 wherein said in-phase potential points are electrically substantially midway between respective sets of terminals, and said out of phase potential points lead or lag their respective terminal voltages by approximately 30°.

4. A phase sequence indicator as set forth in claim 2 wherein said in-phase potential points are electrically substantially midway between their respective sets of terminals, and said out of phase potential points lead or lag their respective terminal voltages by approximately 60°.

5. A phase sequence indicator for three phase voltages comprising first, second and third terminals connectible to a three phase voltage, a pair of circuits connected in parallel with each other between said first and second terminals, one of said circuits being capable of establishing a potential point intermediate said first and second terminals which is such as to be substantially in phase with an alternating voltage impressed across said first and second terminals, the other of said circuits being capable of establishing a potential point intermediate said first and second terminals which is such as to lag in phase the terminal voltage across said first and second terminals when a three phase voltage of a given phase sequence is impressed on said terminals, a pair of circuits connected in parallel with each other between said second and third terminals, one of said last-mentioned circuits being capable of establishing a potential point intermediate said second and third terminals which is such as to be substantially in phase with an alternating voltage impressed across said second and third terminals, the other of said last-mentioned circuits being capable of establishing a potential point intermediate said second and third terminals which is such as to lead in phase the terminal voltage across said second and third terminals when a three phase voltage of the same given phase sequence is impressed on said terminals, first potential sensitive means connected between said in-phase potential point intermediate said first and second terminals and said out of phase potential point between said second and third terminals, and second potential sensitive means connected between said in-phase potential point intermediate said second and third terminals and said out of phase potential point between said first and second terminals.

6. Phase sequence determining means for three phase alternating voltages comprising first, second and third terminals connectible to a three phase voltage, resistor means connected between said first and second terminals and establishing an intermediate potential point substantially in phase with a voltage impressed across said first and second terminals, series connected resistor and capacitor means connected between said first and second terminals in parallel with said first mentioned resistor means and establishing an out of phase potential point which lags the terminal voltage across said first and second terminals when a three phase voltage of one phase sequence is impressed on said terminals and which leads the terminal voltage when a three phase voltage of the opposite phase sequence is impressed on said terminals, second resistor means connected between said second and third terminals and establishing an in-phase potential point intermediate said second and third terminals, series connected resistor and capacitor means connected between said second and third terminals in parallel with said second resistor means and establishing an out of phase potential point which lags the terminal voltage across said second and third terminals when a three phase voltage of said one phase sequence is impressed on said terminals and which leads the terminal voltage when a three phase voltage of said opposite phase sequence is impressed on said terminals.

7. Phase sequence determining means as set forth in claim 6 wherein said in phase potential points are established by said resistor means such as to be electrically substantially midway between their respective sets of terminals, and said series connected resistor and capacitor means are of such magnitude as to establish said out of phase potential points approximately 30° out of phase with their respective terminal voltages.

8. Phase sequence determining means as set forth in claim 6 wherein said in-phase potential points are established by said resistor means electrically substantially midway between their respective sets of terminals, and said series connected resistor and capacitor means are of such magnitude as to establish said out of phase potential points approximately 60° out of phase with their respective terminal voltages.

9. A phase sequence indicator comprising first, second and third terminal means connectible to a three phase alternating voltage, a first pair of series connected resistances of approximately equal electrical resistance connected between said first and second terminals to establish an in-phase potential point which is electrically approximately halfway between said first and second terminals, a first series connected resistance and capacitance combination connected between said first and second terminals in parallel with said series connected resistances, the capacitive reactance of said capacitance being of such magnitude relative to the resistance connected in series therewith as to establish a potential point between said series connected resistance and capacitance which is 30° out of phase with a terminal voltage impressed across said first and second terminals, a second pair of series connected resistances of approximately equal electrical resistance connected between said second and third terminals to establish an in-phase potential point electrically approximately midway between said second and third terminals, and a second series connected resistance and capacitance combination connected between said second and third terminals in parallel with said second pair of series connected resistances, the capacitance reactance and resistance of said second capacitance and resistance combination being of such magnitude as to establish a potential point intermediate said resistance and capacitance which is 30° out of phase with a voltage impressed across said second and third terminals, said resistance and capacitance combinations being connected such that when one of said out of phase potential points leads its respective terminal voltage, the other lags its terminal voltage and vice versa.

10. A phase sequence indicator as set forth in claim 9 having first potential sensitive means connected between the point intermediate said first pair of series connected resistances and the point intermediate said second series connected capacitance and resistance combination, and a second potential sensitive device connected between the potential point intermediate said second pair of series connected resistances and the potential point intermediate said first resistance and capacitance combination.

11. A phase sequence indicator comprising first, second and third terminal means connectible to a three phase alternating voltage, a first pair of series connected resistances of approximately equal electrical resistance connected between said first and second terminals to establish an in-phase potential point which is electrically approximately halfway between said first and second terminals, a first series connected resistance and capacitance combination connected between said first and second terminals in parallel with said series connected resistances, the capacitive reactance of said capacitance being of such magnitude relative to the resistance connected in series therewith as to establish a potential point between said series connected resistance and capacitance which is 60° out of phase with a terminal voltage impressed across said first and second terminals, a second pair of series connected resistances of approximately equal electrical resistance connected between said second and third terminals to establish an in-phase potential point electrically approximately midway between said second and third terminals, and a second series connected resistance and capacitance combination connected between said second and third terminals in parallel with said second pair of series connected resistances, the capacitance reactance and resistance of said second capacitance and resistance combination being of such magnitude as to establish a potential point intermediate said resistance and capacitance which is 60° out of phase with a voltage impressed across said second and third terminals, said resistance and capacitance combinations being connected such that when one of said out of phase potential points leads its respective terminal voltage, the other lags its terminal voltage and vice versa.

12. A phase sequence indicator as set forth in claim 11 having first potential sensitive means connected between the point intermediate said first pair of series connected resistances and the point intermediate said second series connected capacitance and resistance combination, and a second potential sensitive device connected between the potential point intermediate said second pair of series connected resistances and the potential point intermediate said first resistance and capacitance combination.

References Cited in the file of this patent

"Journal of Scientific Instruments," October 1953, pp. 375–378. Copy in 324–86.